US012185057B2

(12) United States Patent
Wang (10) Patent No.: US 12,185,057 B2
(45) Date of Patent: Dec. 31, 2024

(54) SPEAKER STRUCTURE AND ELECTRONIC DEVICE

(71) Applicant: VIVO MOBILE COMMUNICATION CO., LTD., Guangdong (CN)

(72) Inventor: Heng Wang, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 178 days.

(21) Appl. No.: 18/097,999

(22) Filed: Jan. 17, 2023

(65) Prior Publication Data
US 2023/0156398 A1    May 18, 2023

Related U.S. Application Data

(63) Continuation of application No. PCT/CN2021/109311, filed on Jul. 29, 2021.

(30) Foreign Application Priority Data

Jul. 31, 2020    (CN) .......................... 202010764932.9

(51) Int. Cl.
*H04R 1/34*    (2006.01)
*H04M 1/02*    (2006.01)
(Continued)

(52) U.S. Cl.
CPC ............. *H04R 1/345* (2013.01); *H04R 1/025* (2013.01); *H04R 1/028* (2013.01); *H04R 3/00* (2013.01);
(Continued)

(58) Field of Classification Search
CPC ........ H04R 1/345; H04R 1/025; H04R 1/028; H04R 2499/11; H04R 3/00; H04R 29/001; H04M 1/026
See application file for complete search history.

(56) References Cited

U.S. PATENT DOCUMENTS 2,805,729 A    9/1957  Read
2011/0129109 A1    6/2011  Okutsu
(Continued)

FOREIGN PATENT DOCUMENTS

CN    108632725 A    10/2018
JP    3063503 U    11/1999
(Continued)

*Primary Examiner* — Andrew Sniezek
(74) *Attorney, Agent, or Firm* — Price Heneveld LLP (57) ABSTRACT

A speaker structure and an electronic device are provided, belonging to the technical field of communications devices. The speaker structure includes a speaker housing and a sounding portion. The speaker housing is provided with an inner cavity. The inner cavity has a closed end and an open end. The sounding portion is disposed in the inner cavity. A sounding surface of the sounding portion faces the open end. At least part of the speaker housing is an electro-deformation structural part. The speaker housing switches between a first shape, a second shape, and a third shape in a case that the speaker housing is powered on. A sounding direction of the speaker structure is a first direction in a case that the speaker housing is in the first shape. The sounding direction of the speaker structure is a second direction in a case that the speaker housing is in the second shape. The sounding direction of the speaker structure is a third direction in a case that the speaker housing is in the third shape. The first direction, the second direction, and the third direction are different directions.

16 Claims, 4 Drawing Sheets

(51) Int. Cl.
*H04R 1/02* (2006.01)
*H04R 3/00* (2006.01)
*H04R 29/00* (2006.01)

(52) U.S. Cl.
CPC ........... *H04R 29/001* (2013.01); *H04M 1/026* (2013.01); *H04R 2499/11* (2013.01)

(56) References Cited

U.S. PATENT DOCUMENTS

| | | |
|---|---|---|
| 2017/0055054 A1 | 2/2017 | Brogan |
| 2017/0295426 A1 | 10/2017 | Park et al. |
| 2018/0352329 A1 | 12/2018 | Klingler et al. |
| 2019/0104645 A1* | 4/2019 | Paseman ................ G06F 1/203 |
| 2019/0261082 A1 | 8/2019 | May |

FOREIGN PATENT DOCUMENTS

| | | | |
|---|---|---|---|
| JP | 2004064507 A | 2/2004 | |
| JP | 2011119918 A | 6/2011 | |
| JP | 2012233413 A | 11/2012 | |
| KR | 20060090126 A | 8/2006 | |
| KR | 101224814 B1 | 1/2013 | |
| WO | 2007115373 A1 | 10/2007 | |
| WO | 2017018243 A1 | 2/2017 | |

\* cited by examiner

SPEAKER STRUCTURE AND ELECTRONIC DEVICE

CROSS-REFERENCE TO RELATED APPLICATIONS

This application claims is a continuation application of International Application No. PCT/CN2021/109311 filed on Jul. 29, 2021, which priority to Chinese Patent Application No. 202010764932.9, filed with the China National Intellectual Property Administration on Jul. 31, 2020 and entitled "SPEAKER STRUCTURE AND ELECTRONIC DEVICE", which is incorporated herein by reference in its entirety.

TECHNICAL FIELD

This application relates to the technical field of communications devices, and in particular, to a speaker structure and an electronic device.

BACKGROUND

With the rapid development of electronic devices, the electronic devices are applied increasingly widely, for example, mobile phones, tablet computers, and the like play a growing number of roles in people's work, life, entertainment, and the like.

In the related art, the electronic device is provided with a speaker structure. The speaker structure is configured to implement a function of external sound amplification of the electronic device.

In a process of implementing the present invention, the inventor found the following problems in the related art: a traveling direction of a sound of the speaker structure mainly depends on a shape of a speaker housing. A shape of an existing speaker housing is mostly a structure with a large area at an open end and a small area at a closed end. A speaker housing of such shape can only disperse a sound, so that the sound can travel in all directions. However, when only one user needs to hear a sound played by the speaker structure, a speaker structure of the above structure cannot implement an application of such scenario, resulting in poor use performance of the speaker structure.

SUMMARY

Embodiments of this application are intended to provide a speaker structure and an electronic device, which can resolve a problem of poor use performance of the speaker structure.

To resolve the foregoing technical problem, this application is implemented as follows.

According to a first aspect, an embodiment of this application provides a speaker structure, applied to an electronic device. The speaker structure includes a speaker housing and a sounding portion.

The speaker housing is provided with an inner cavity. The inner cavity has a closed end and an open end. The sounding portion is disposed in the inner cavity, and a sounding surface of the sounding portion faces the open end. At least part of the speaker housing is an electro-deformation structural part.

The speaker housing has a first shape, a second shape, and a third shape. In a case that the speaker housing is powered on, the speaker housing switches between the first shape, the second shape, and the third shape.

In a case that the speaker housing is in the first shape, a sounding direction of the speaker structure is a first direction. In a case that the speaker housing is in the second shape, the sounding direction of the speaker structure is a second direction. In a case that the speaker housing is in the third shape, the sounding direction of the speaker structure is a third direction. The first direction, the second direction, and the third direction are different directions.

According to a second aspect, an electronic device is provided, including the foregoing speaker structure.

According to a third aspect, a control method of speaker structure is provided, applied to the foregoing speaker structure. The control method comprises:
receiving a first input; and
in response to the first input, powering on the speaker housing, where the speaker housing is deformed, and the speaker housing is one of the first shape, the second shape, and the third shape.

According to a fourth aspect, a control apparatus of speaker structure is provided, applied to the foregoing speaker structure. The control apparatus includes:
a first receiving module, configured to receive a first input; and
a first control module, configured to, in response to the first input, power on the speaker housing to deform the speaker housing, where the speaker housing is one of the first shape, the second shape, and the third shape.

According to a fifth aspect, an electronic device is provided, including a processor, a memory, and a program or an instruction stored in the memory and capable of running on the processor, where when the program or the instruction is executed by the processor, the steps of the foregoing method are implemented.

According to a sixth aspect, a readable storage medium is provided, where the readable storage medium stores a program or an instruction, and when the program or the instruction is executed by a processor, the steps of the foregoing method are implemented.

Reference numerals in the accompanying drawings are as follows:

100. electronic device; 110. device housing; 111. accommodating space; 112. sound guide hole; 120. battery; 200. speaker structure; 201. housing portion; 210. speaker housing; 211. open end; 212. closed end; 213. inner cavity; and 220. sounding portion.

DESCRIPTION OF EMBODIMENTS

The following clearly and completely describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

The terms "first", "second", and the like in the specification and claims of this application are used to distinguish between similar objects instead of describing a specific order or sequence. It should be understood that data used in this way may be interchangeable in appropriate cases, so that the embodiments of this application can be implemented in a sequence other than those shown or described herein. In addition, in the specification and the claims, "and/or" represents at least one of connected objects, and a character "/" generally represents an "or" relationship between associated objects.

The following describes in detail the speaker structure provided in the embodiments of this application through specific embodiments and application scenarios thereof with reference to the accompanying drawings.

Referring to FIG. 1 to FIG. 8, the embodiments of this application disclose a speaker structure 200. The speaker structure 200 is an acoustic device of an electronic device 100 and applied to the electronic device 100. The speaker structure 200 includes a speaker housing 210 and a sounding portion 220.

Figure 2:
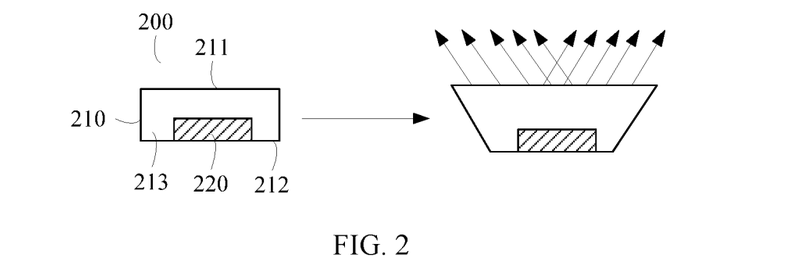
FIG. 2 is a schematic structural diagram of a speaker housing in a first shape according to a speaker in an embodiment of this application.
Figure 3:
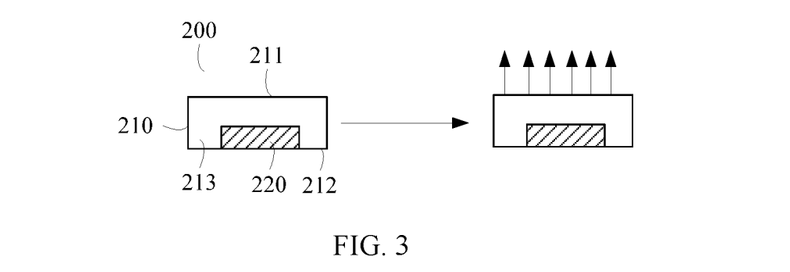
FIG. 3 is a schematic structural diagram of a speaker housing in a second shape according to a speaker in an embodiment of this application.
Figure 4:
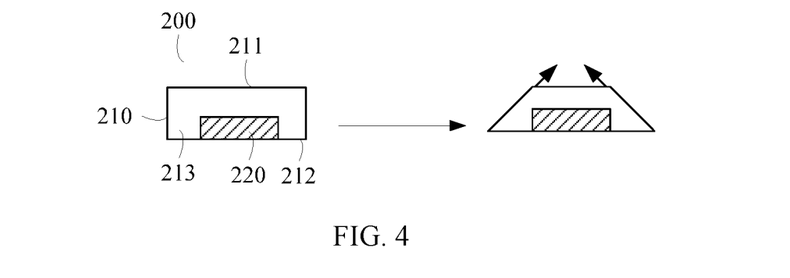
FIG. 4 is a schematic structural diagram of a speaker housing in a third shape according to a speaker in an embodiment of this application.
Figure 5:
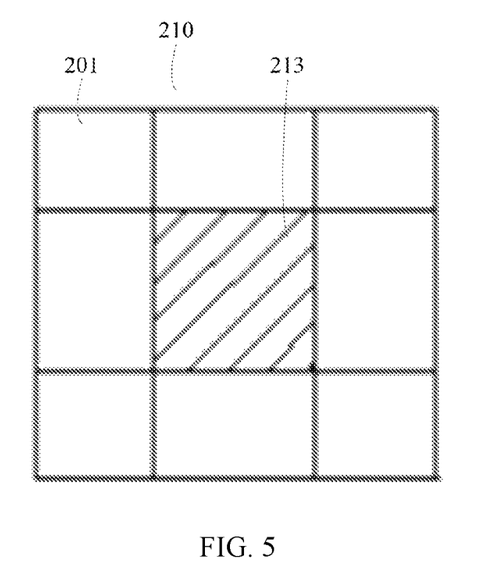
FIG. 5 to FIG. 8 are vertical views of a speaker housing according to a speaker in an embodiment of this application.
Figure 6:
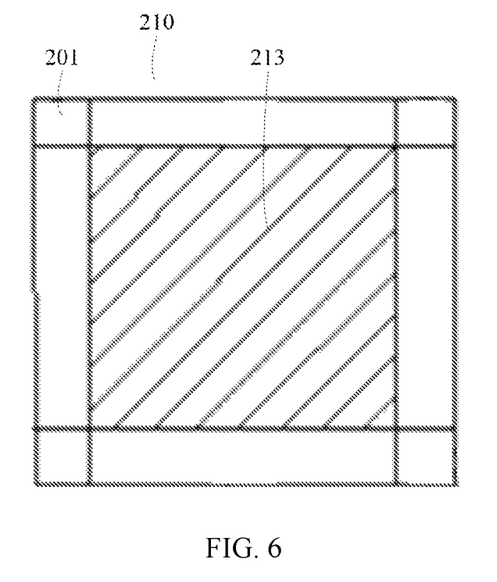
Figure 7:
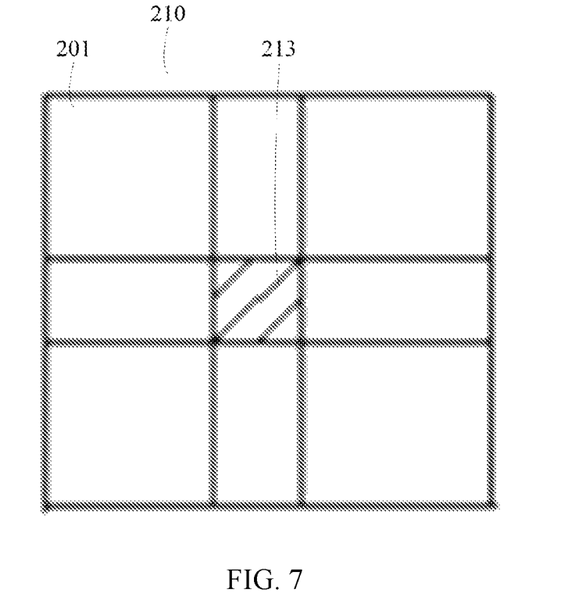
Figure 8:
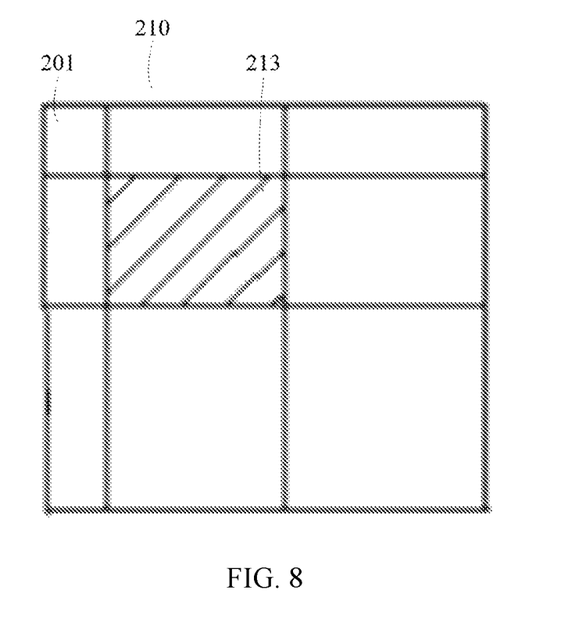

The speaker housing 210 is provided with an inner cavity 213. The inner cavity 213 has a closed end 212 and an open end 211. The sounding portion 220 is disposed in the inner cavity 213, and a sounding surface of the sounding portion 220 faces the open end 211. That is, a sound generated by the sounding portion 220 emits through the open end 211. The sounding portion 220 generates vibration during operation, thereby driving air in the inner cavity 213 to vibrate to finally generate a sound.

At least part of the speaker housing 210 is an electro-deformation structural part. The speaker housing 210 is electrically connected with the electronic device 100, and then the electronic device 100 supplies power to the speaker housing 210. In a case that the speaker housing 210 is powered on, the speaker housing 210 generates heat, thereby causing the speaker housing 210 to deform. Because a current or a voltage input by the electronic device 100 is different in volume or frequency, an amount of heat of the speaker housing 210 is different, thereby controlling the speaker housing 210 to deform.

The speaker housing 210 has a first shape, a second shape, and a third shape. In a case that the speaker housing 210 is powered on, the speaker housing 210 switches between the first shape, the second shape, and the third shape. In a case that the speaker housing 210 is in the first shape, a sounding direction of the speaker structure 200 is a first direction. In a case that the speaker housing 210 is in the second shape, the sounding direction of the speaker structure 200 is a second direction. In a case that the speaker housing 210 is in the third shape, the sounding direction of the speaker structure 200 is a third direction. The first direction, the second direction, and the third direction are different directions.

In an embodiment disclosed in this application, the sound generated by the sounding portion 220 emits through the speaker housing 210. Therefore, the shape of the speaker housing 210 can determine the traveling direction of the sound of the speaker structure 200. Each shape of the speaker housing 210 corresponds to one sounding direction of the speaker structure 200. Changing the shape of the speaker housing 210 can change the sounding direction of the speaker structure 200. In this case, the user can switch the required shape of the speaker housing 210 according to an application scenario, to implement the application of the speaker structure 200 in a plurality of scenarios, thereby improving use performance of the speaker structure 200.

In a specific operation process, in the case of the first shape, in a projection direction of the axis of the open end 211, a projection profile of the closed end 212 may be located within a projection profile of the open end 211, that is, in a direction of the open end 211 pointing to the closed end 212, the inner cavity 213 is a tapered structure. In this case, an area of the closed end 212 is larger than an area of the open end 211, so that the sound can spread, and a sound traveling range can be increased. Therefore, more people can hear the sound emitted by the speaker structure 200. In this case, the sounding direction of the speaker structure 200 is the first direction.

In the case of the second shape, in the projection direction of the axis of the open end 211, the projection profile of the open end 211 can coincide with the projection profile of the closed end 212. In this case, the area of the open end 211 is the same as the area of the closed end 212, and the sound is not easy to spread around, thereby reducing the sound traveling range, so that fewer people can hear the sound emitted by the speaker structure 200. In this case, the sounding direction of the speaker structure 200 is the second direction.

In the case of the third shape, in the projection direction of the axis of the open end 211, the projection profile of the open end 211 may be located within the projection profile of the closed end 212, that is, in the direction of the closed end 212 pointing to the open end 211, the inner cavity 213 is a tapered structure. In this case, the area of the open end 211 is smaller than the area of the closed end 212, so that the sound is concentrated, and directional traveling of the sound can be achieved. In this case, the sounding direction of the speaker structure 200 is the third direction.

In this solution, the speaker structure 200 can spread the sound, thereby increasing the traveling range of the sound, and also concentrate the sound, thereby implementing the directional traveling of the sound, so that privacy of the sound is protected, application scenarios of the speaker structure 200 are increased, and use performance of the speaker structure 200 is improved.

To make the speaker housing 210 have better deformation performance, in another optional embodiment, the speaker housing 210 can be an electro-deformation structural part, that is, the speaker housing 210 is made of electro-deformation materials. This solution further improves deformation performance of the speaker housing 210.

In the foregoing embodiment, the speaker housing 210 may be an integrated structural part. The speaker housing 210 is deformed as a whole, and is difficult to deform locally, thus it is difficult to adjust a direction and an area of a sound outlet of the opening end 211. Therefore, in another optional embodiment, the speaker housing 210 may include a plurality of housing portions 201. The plurality of housing portions 201 can be connected end-to-end to form an annular structural part, and the plurality of housing portions 201 may be electrically connected with the electronic device 100. In this solution, the housing portion 201 can deform independently. Independent deformation means that the electronic device 100 can control each housing portion 201 to deform independently without affecting another adjacent housing portion 201. In this case, the plurality of housing portions 201 can change the area of the sound outlet of the open end 211 and the direction of the sound outlet through a combination of different deformation, thereby controlling the sound traveling direction of the speaker structure 200, and improving use performance of the speaker structure 200.

Optionally, the speaker housing 210 may be a cube structure, and the speaker housing 210 can be formed by connecting eight housing portions 201 end to end. Four of the housing portions 201 form four side walls of the speaker housing 210 in pairs, and the other four housing portions 201 are four corners of the cube structure. Certainly, a quantity of the housing portions 201, a specific structure of the speaker housing 210 enclosed by the housing portions 201, and other types are not limited herein.

In an optional embodiment, the electro-deformation structural part may be a shape memory alloy part, and a shape of the shape memory alloy part can be adjusted by adjusting a volume of a current or a voltage, thereby making the deformation of the shape memory alloy part more flexible.

In another optional embodiment, the electro-deformation structural part is a piezoelectric structural part. The piezoelectric structural part is easy to process and convenient to manufacture, thereby making cost of the speaker structure 200 low. Optionally, the piezoelectric structural part may be made of piezoelectric ceramic materials. Certainly, the piezoelectric structural part may also be made of other piezoelectric materials, which is not limited in this specification.

The speaker structure 200 disclosed in an embodiment of this application further includes a temperature sensor. The temperature sensor is electrically connected with the speaker housing 210. The temperature sensor is electrically connected with the electronic device 100. The electronic device 100 can control the speaker housing 210 to be powered on or off based on a temperature detected by the temperature sensor. In this case, it is possible to better avoid a problem that a local temperature of the electronic device 100 rises rapidly during powering on of the speaker housing 210. Specifically, the temperature sensor can be electrically connected with a circuit board of the electronic device 100, and the temperature detected by the temperature sensor can be displayed on a display screen of the electronic device 100, thereby helping the user control deformation of the speaker housing 210.

In the foregoing embodiment, an excessively high temperature of the speaker housing 210 may make it difficult for the speaker housing 210 to recover from the deformation, thereby damaging the speaker housing 210. Therefore, in another optional embodiment, a temperature value that the speaker housing 210 can withstand, that is, a preset temperature, can be preset. When the temperature of the speaker housing 210 is greater than the preset temperature, the speaker housing is in a power-off state, that is, when the temperature of the speaker housing 210 exceeds the preset temperature, the electronic device can control the speaker housing 210 to be powered off. In this case, the preset temperature may be a maximum temperature at which the speaker housing 210 can be deformed. When the temperature of the speaker housing 210 is higher than the preset temperature, the electronic device can control the speaker housing 210 to be powered off, thereby preventing the speaker housing 210 from damage a sounding function due to overheating, and improving safety and reliability of the speaker structure.

According to the speaker structure 200 described in any one of the foregoing embodiments of this application, an embodiment of this application also discloses an electronic device 100. The disclosed electronic device 100 includes the speaker structure 200 described in any one of the foregoing embodiments.

The electronic device 100 disclosed in this embodiment of this application may be a smart phone, a tablet computer, an e-book reader, or a wearable device. Certainly, the electronic device 100 may also be other devices, which is not limited in this embodiment of the present invention.

Figure 1:
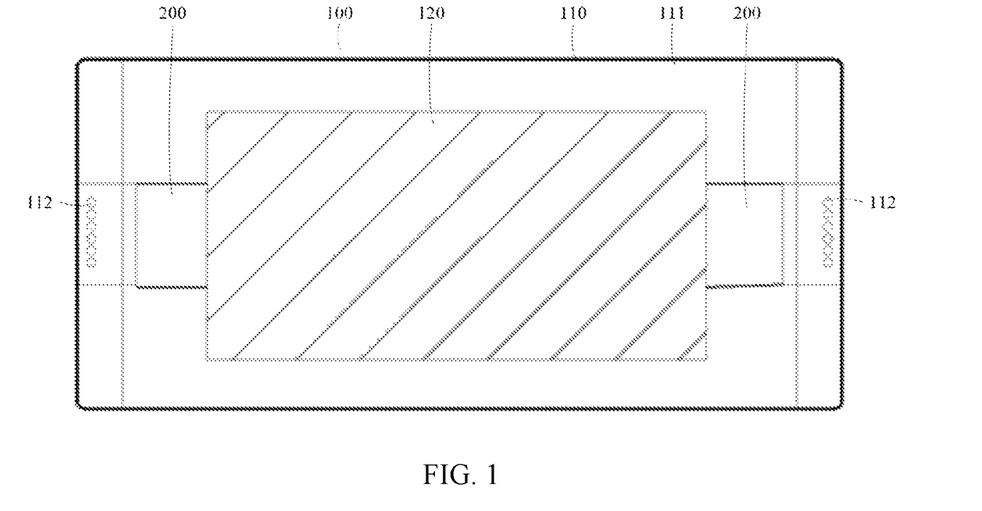
FIG. 1 is a schematic structural diagram of an electronic device according to an embodiment of this application.

In another optional embodiment, the electronic device 100 disclosed in this embodiment of this application may also include a device housing 110 and a battery 120. The device housing 110 provides an installation basis for other components of the electronic device 100. The battery 120 supplies power to electricity consumption components of the electronic device 100. The device housing 110 may be provided with an accommodating space 111 and a sound guide hole 112 connected with the accommodating space 111. The battery 120 may be located in the accommodating space 111, the speaker housing 210 may be electrically connected with the battery 120, and the sound guide hole 112 may be connected with the inner cavity 213. The sound emitted by the speaker structure 200 may travel outside the electronic device 100 through the sound guide hole 112. In this solution, electric energy required for the deformation of the speaker housing 210 may be provided by the battery 120, so that no additional power supply device is required for the speaker housing 210. Therefore, the structure of the speaker structure 200 is simplified, and manufacturing cost of the electronic device 100 is reduced.

Specifically, the speaker structure 200 may be disposed on a circuit board of the electronic device 100. The circuit board may be a mother board of the electronic device 100 or a sub board of the electronic device 100. The circuit board is electrically connected with the battery 120 to supply power to the speaker housing 210. Certainly, the speaker housing 210 may also be directly connected with the battery 120 through a wire. A specific electrical connection mode of the speaker housing 210 is not limited herein.

To improve acoustic performance of the electronic device 100, in another optional embodiment, a quantity of the speaker structures 200 is at least two, and the at least two speaker structures 200 are separately located at both ends of the battery 120, that is, the at least two speaker structures 200 are separately located at the top end and low end of the electronic device 100. In this solution, when the electronic device 100 plays video or music, a sound is emitted from both ends of the electronic device 100, thereby producing a stereo effect, improving acoustic performance of the electronic device 100, and improving user experience.

In the foregoing embodiment, because at least part of the speaker housing 210 is an electro-deformation structural part, the speaker housing 210 can deform and expand when being powered on. Therefore, in another optional embodiment, in an assembly process of the electronic device 100, there is an assembly gap between components in the device housing 110, and the speaker housing 210 can make full use of the assembly gap when a volume of the speaker housing 210 increases after being powered on. In this case, a volume of the speaker structure 200 may be set smaller, so that the speaker structure 200 occupies less internal space of the electronic device 100, thereby improving lightness of the electronic device 100.

According to the speaker structure 200 disclosed in this embodiment of this application, an embodiment of this application discloses a control method of speaker structure 200. The disclosed control method is applied to the speaker structure 200 as described above. The disclosed control method includes:

S101: Receive a first input.

The first input is temperature, current, voltage and other parameters corresponding to a first shape, a second shape, and a third shape of the speaker housing 210. The first input may be set according to a user's usage scenario.

S102: In response to the first input, power on the speaker housing 210, and deform the speaker housing 210, where the speaker housing 210 is one of the first shape, the second shape, or the third shape.

In a specific operation process, the electronic device is set with three operation modes. The three operation modes are a multi-user mode, a normal mode, and a privacy mode. The multi-user mode corresponds to the first shape of the speaker housing 210, the normal mode corresponds to the second shape of the speaker housing 210, and the privacy mode corresponds to the third shape of the speaker housing 210. The user selects the desired mode so that the speaker housing 210 is deformed to a corresponding shape.

The user can adjust the sound traveling range of the speaker structure 200 by changing the shape of the speaker housing 210, thereby implementing an application of the speaker structure 200 in a plurality of scenes, and improving use performance of the speaker structure 200.

According to the control method disclosed in this embodiment of this application, an embodiment of this application discloses a control apparatus of speaker structure 200. The disclosed control apparatus includes:

a receiving module, configured to receive a first input; and
a first control module, configured to, in response to the first input, power on the speaker housing 210, and deform the speaker housing 210, where the speaker housing 210 is one of the first shape, the second shape, or the third shape.

The user can adjust the sound traveling range of the speaker structure 200 by changing the shape of the speaker housing 210, thereby implementing an application of the speaker structure 200 in a plurality of scenes, and improving use performance of the speaker structure 200.

Figure 9:
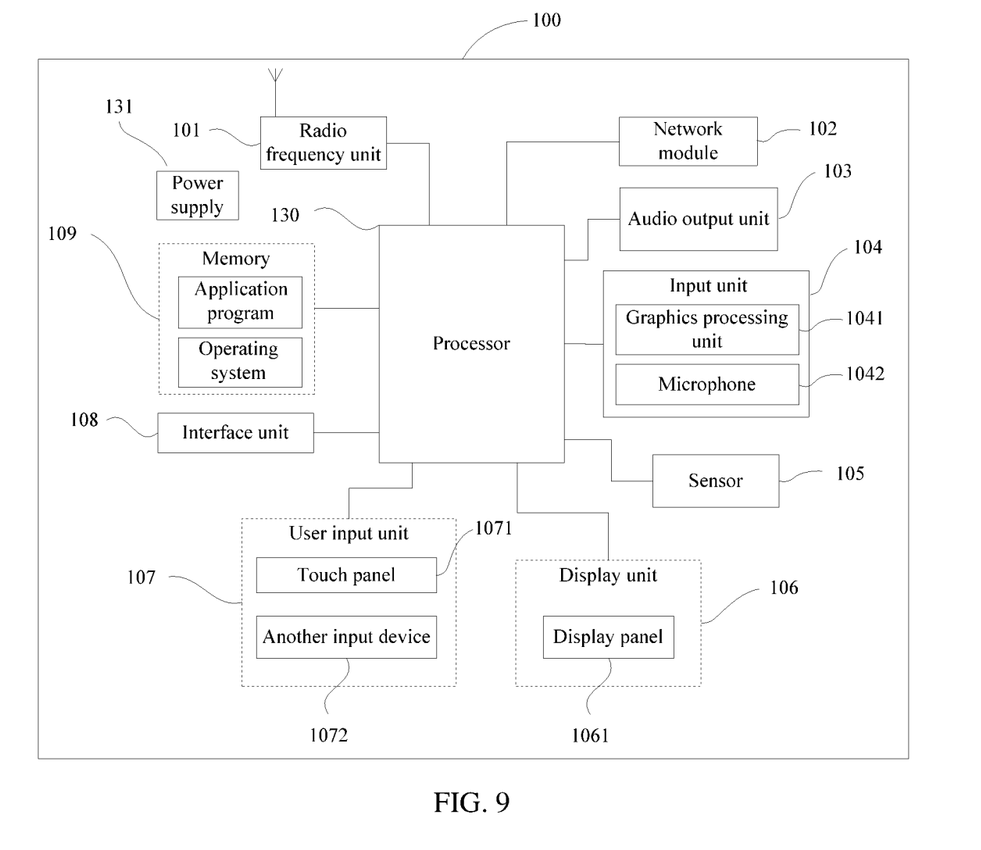
FIG. 9 is a schematic diagram of a hardware structure of an electronic device according to an embodiment of this application.

FIG. 9 is a schematic structural diagram of hardware of an electronic device for implementing embodiments of this application.

The electronic device 100 includes but is not limited to components such as a radio frequency unit 101, a network module 102, an audio output unit 103, an input unit 104, a sensor 105, a display unit 106, a user input unit 107, an interface unit 108, a memory 109, a processor 130, and a power supply 131. A person skilled in the art may understand that a structure of the electronic device shown in FIG. 9 constitutes no limitation on the electronic device, and the electronic device may include more or fewer components than those shown in the figure, or have a combination of some components, or have a different component arrangement.

The processor 130 is configured to obtain the first input and transmit the first input to the speaker housing 210.

The audio output unit 103 is configured to control the sounding portion 220 to vibrate and make a sound.

The electronic device disclosed in this embodiment of this application improves the structure of the electronic device in the prior art. By changing the shape of the speaker housing 210, the application of the speaker structure 200 in a plurality of scenes is implemented, and use performance of the speaker structure 200 is improved.

It should be understood that, in this embodiment of this application, the radio frequency unit 101 may be configured to receive and send information or a signal in a call process. Specifically, after receiving downlink data from a base station, the radio frequency unit sends the downlink data to the processor 130 for processing. In addition, the radio frequency unit sends uplink data to the base station. Usually, the radio frequency unit 101 includes but is not limited to an antenna, at least one amplifier, a transceiver, a coupler, a low noise amplifier, a duplexer, and the like. In addition, the radio frequency unit 101 may further communicate with a network and another device by using a wireless communication system.

The electronic device provides users with wireless broadband Internet access through the network module 102, for example, helps users receive and send e-mails, browse web pages, and access streaming media.

The audio output unit 103 may convert audio data received by the radio frequency unit 101 or the network module 102 or stored in the memory 109 into an audio signal and output the audio signal as sound. In addition, the audio output unit 103 can further provide audio output related to a specific function performed by the electronic device 100 (for example, call signal received sound and message received sound). The audio output unit 103 includes a speaker, a buzzer, a telephone receiver, and the like.

The input unit 104 is configured to receive an audio signal or a video signal. The input unit 104 may include a graphics processing unit (GPU) 1041 and a microphone 1042. The graphics processing unit 1041 processes image data of a static picture or a video obtained by an image capture apparatus (such as a camera) in a video capture mode or an image capture mode. A processed image frame may be displayed on the display unit 106. The image frame processed by the graphics processor 1041 may be stored in the memory 109 (or another storage medium) or sent by using the radio frequency unit 101 or the network module 102. The microphone 1042 can receive sound and can process such sound into audio data. Processed audio data may be converted, in a call mode, into a format that can be sent to a mobile communication base station by using the radio frequency unit 101 for output.

The electronic device 100 further includes at least one sensor 105, for example, a light sensor, a motion sensor, and another sensor. Specifically, the light sensor includes an ambient light sensor and a proximity sensor. The ambient light sensor may adjust luminance of the display panel 1061 based on brightness of ambient light. The proximity sensor may turn off the display panel 1061 and/or backlight when the electronic device 100 moves close to an ear. As a type of the motion sensor, an accelerometer sensor may detect an acceleration value in each direction (generally, three axes), and detect a value and a direction of gravity when the accelerometer sensor is static, and may be used for recognizing a posture of the electronic device (such as screen switching between landscape and portrait modes, a related game, or magnetometer posture calibration), a function related to vibration recognition (such as a pedometer or a knock), and the like. The sensor 105 may further include a fingerprint sensor, a pressure sensor, an iris sensor, a molecular sensor, a gyroscope, a barometer, a hygrometer, a thermometer, an infrared sensor, and the like. Details are not described herein.

The display unit 106 is configured to display information entered by a user or information provided for a user. The display unit 106 may include a display panel 1061. The display panel 1061 may be configured in a form of a liquid crystal display (LCD), an organic light-emitting diode (OLED), or the like.

The user input unit 107 may be configured to: receive input digital or character information, and generate key signal input related to a user setting and function control of the electronic device. Specifically, the user input unit 107 includes a touch panel 1071 and another input device 1072. The touch panel 1071 is also referred to as a touchscreen, and may collect a touch operation performed by a user on or near the touch panel 1071 (for example, an operation performed by a user on the touch panel 1071 or near the touch panel 1071 by using any proper object or accessory, for example, a finger or a stylus). The touch panel 1071 may include two parts: a touch detection apparatus and a touch controller. The touch detection apparatus detects a touch location of the user, detects a signal brought by the touch operation, and sends the signal to the touch controller. The touch controller receives touch information from the touch detection apparatus, converts the touch information into touch point coordinates, sends the touch point coordinates to the processor 130, and receives and executes a command sent by the processor 130. In addition, the touch panel 1071 may be implemented in various types such as a resistor, a capacitor, an infrared ray, or a surface acoustic wave. The user input unit 107 may further include another input device 1072 in addition to the touch panel 1071. Specifically, the another input device 1072 may include but is not limited to a physical keyboard, a functional button (such as a volume control button or a power on/off button), a trackball, a mouse, and a joystick. Details are not described herein.

Further, the touch panel 1071 may cover the display panel 1061. When detecting the touch operation on or near the touch panel 1071, the touch panel 1071 transmits the touch operation to the processor 130 to determine a type of a touch event, and then the processor 130 provides corresponding visual output on the display panel 1061 based on the type of the touch event. Although in FIG. 9, the touch panel 1071 and the display panel 1061 are configured as two independent components to implement input and output functions of the electronic device, in some embodiments, the touch panel 1071 and the display panel 1061 can be integrated to implement the input and output functions of the electronic device. Details are not limited herein.

The interface unit 108 is an interface for connecting an external apparatus with the electronic device 100. For example, the external apparatus may include a wired or wireless headphone port, an external power supply (or a battery charger) port, a wired or wireless data port, a storage card port, a port used to connect to an apparatus having an identity module, an audio input/output (I/O) port, a video I/O port, a headset port, and the like. The interface unit 108 may be configured to receive an input (for example, data information and power) from an external apparatus and transmit the received input to one or more elements in the electronic device 100, or may be configured to transmit data between the electronic device 100 and the external apparatus.

The memory 109 may be configured to store a software program and various pieces of data. The memory 109 may mainly include a program storage area and a data storage area. The program storage area may store an operating system, an application program required by at least one function (such as a sound play function or an image play function), and the like. The data storage area may store data (such as audio data or an address book) or the like created based on use of the mobile phone. In addition, the memory 109 may include a high-speed random access memory, and may further include a nonvolatile memory, for example, at least one magnetic disk storage device, a flash storage device, or another volatile solid-state storage device.

The processor 130 is a control center of the electronic device. The processor 130 uses various interfaces and lines to connect all parts of the entire electronic device, and performs various functions and data processing of the electronic device by running or executing the software program and/or module stored in the memory 109 and invoking data stored in the memory 109, thereby performing overall monitoring on the electronic device. The processor 130 may include one or more processing units. Preferably, an application processor and a modem processor may be integrated into the processor 130. The application processor mainly processes an operating system, a user interface, an application program, and the like. The modem processor mainly processes wireless communications. It can be understood that, alternatively, the modem processor may not be integrated into the processor 130.

The electronic device 100 may further include a power supply 131 (such as a battery) supplying power to each component. Preferably, the power supply 131 may be logically connected to the processor 130 by using a power management system, so as to implement functions such as charging management, discharging management and power consumption management by using the power management system.

In addition, the electronic device 100 includes some function modules not shown. Details are not described herein.

Preferably, an embodiment of this application further provides an electronic device, including a processor 130, a memory 109, and a program or an instruction stored in the memory 109 and capable of running on the processor 130. When the program or the instruction is executed by the processor 130, the processes of the foregoing embodiments of control method of the electronic device are implemented, with the same technical effects achieved. To avoid repetition, details are not described herein again.

An embodiment of this application further provides a readable storage medium. The readable storage medium stores a program or an instruction. When the program or the instruction is executed by a processor, the processes in the embodiments of the control method of the electronic device are implemented, and the same technical effect can be achieved. To avoid repetition, details are not described herein again. For example, the readable storage medium is a read-only memory (ROM), a random access memory (RAM), a magnetic disk, an optical disc, or the like.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. In the absence of more restrictions, an element defined by the statement "including a . . . " does not preclude the presence of other identical elements in the process, method, article, or apparatus that includes the element.

Based on the descriptions of the foregoing implementation manners, a person skilled in the art may clearly understand that the method in the foregoing embodiment may be implemented by software in addition to a necessary universal hardware platform or by hardware only. In most circumstances, the former is a preferred implementation manner.

Based on such an understanding, the technical solutions of the present invention essentially or the part contributing to the prior art may be implemented in a form of a software product. The computer software product is stored in a storage medium (such as a ROM/RAM, a hard disk, or an optical disc), and includes several instructions for instructing a terminal (which may be mobile phone, a computer, a server, an air conditioner, a network device, or the like) to perform the methods described in the embodiments of the present invention.

The embodiments of this application are described above with reference to the accompanying drawings, but this application is not limited to the foregoing specific implementation manners. The foregoing specific implementation manners are merely schematic instead of restrictive. Under enlightenment of this application, a person of ordinary skills in the art may make many forms without departing from aims and the protection scope of claims of this application, all of which fall within the protection scope of this application.

The invention claimed is:

1. A speaker structure, applied to an electronic device, comprising a speaker housing and a sounding portion; wherein
the speaker housing is provided with an inner cavity, the inner cavity has a closed end and an open end, the sounding portion is disposed in the inner cavity, a sounding surface of the sounding portion faces the open end, and at least part of the speaker housing is an electro-deformation structural part;
the speaker housing has a first shape, a second shape, and a third shape, wherein in a case that the speaker housing is powered on, the speaker housing switches between the first shape, the second shape, and the third shape; and
in a case that the speaker housing is in the first shape, a sounding direction of the speaker structure is a first direction; in a case that the speaker housing is in the second shape, the sounding direction of the speaker structure is a second direction; and in a case that the speaker housing is in the third shape, the sounding direction of the speaker structure is a third direction, wherein the first direction, the second direction, and the third direction are different directions.

2. The speaker structure according to claim 1, wherein in the case of the first shape, in a projection direction of an axis of the open end, a projection profile of the closed end is within a projection profile of the open end;
in the case of the second shape, in the projection direction of the axis of the open end, the projection profile of the open end coincides with the projection profile of the closed end; and
in the case of the third shape, in the projection direction of the axis of the open end, the projection profile of the open end is within the projection profile of the closed end.

3. The speaker structure according to claim 1, wherein the speaker housing is an electro-deformation structural part.

4. The speaker structure according to claim 1, wherein the speaker housing comprises a plurality of housing portions, the plurality of housing portions are connected end to end to form an annular structural part, and the plurality of housing portions are separately electrically connected with the electronic device.

5. The speaker structure according to claim 1, wherein the electro-deformation structural part is a shape memory alloy part; or
the electro-deformation structural part is a piezoelectric structural part.

6. The speaker structure according to claim 1, wherein the speaker structure further comprises a temperature sensor, the temperature sensor is electrically connected with the speaker housing, the temperature sensor is electrically connected with the electronic device, and the electronic device controls the speaker housing to be powered on or off based on a temperature detected by the temperature sensor.

7. The speaker structure according to claim 6, wherein in a case that a temperature of the speaker housing is higher than a preset temperature, the speaker housing is in a power-off state.

8. An electronic device, comprising a speaker structure, wherein the speaker structure comprises a speaker housing and a sounding portion; wherein
the speaker housing is provided with an inner cavity, the inner cavity has a closed end and an open end, the sounding portion is disposed in the inner cavity, a sounding surface of the sounding portion faces the open end, and at least part of the speaker housing is an electro-deformation structural part;
the speaker housing has a first shape, a second shape, and a third shape, wherein in a case that the speaker housing is powered on, the speaker housing switches between the first shape, the second shape, and the third shape; and
in a case that the speaker housing is in the first shape, a sounding direction of the speaker structure is a first direction; in a case that the speaker housing is in the second shape, the sounding direction of the speaker structure is a second direction; and in a case that the speaker housing is in the third shape, the sounding direction of the speaker structure is a third direction, wherein the first direction, the second direction, and the third direction are different directions.

9. The electronic device according to claim 8, wherein in the case of the first shape, in a projection direction of an axis of the open end, a projection profile of the closed end is within a projection profile of the open end;
in the case of the second shape, in the projection direction of the axis of the open end, the projection profile of the open end coincides with the projection profile of the closed end; and
in the case of the third shape, in the projection direction of the axis of the open end, the projection profile of the open end is within the projection profile of the closed end.

10. The electronic device according to claim 9, wherein a quantity of the speaker structures is at least two, and the at least two speaker structures are located at both ends of the battery.

11. The electronic device according to claim 8, wherein the speaker housing is an electro-deformation structural part.

12. The electronic device according to claim 8, wherein the speaker housing comprises a plurality of housing portions, the plurality of housing portions are connected end to end to form an annular structural part, and the plurality of housing portions (201) are separately electrically connected with the electronic device.

13. The electronic device according to claim 8, wherein the electro-deformation structural part is a shape memory alloy part; or
the electro-deformation structural part is a piezoelectric structural part.

14. The electronic device according to claim 8, wherein the speaker structure (200) further comprises a temperature sensor, the temperature sensor is electrically connected with the speaker housing, the temperature sensor is electrically connected with the electronic device, and the electronic device controls the speaker housing to be powered on or off based on a temperature detected by the temperature sensor.

15. The electronic device according to claim 14, wherein in a case that a temperature of the speaker housing is higher than a preset temperature, the speaker housing is in a power-off state.

16. The electronic device according to claim 8, wherein the electronic device further comprises a device housing and a battery, the device housing is provided with an accommodating space and a sound guide hole that communicates with the accommodating space, the battery is in the accommodating space, the speaker housing is electrically connected with the battery, and the sound guide hole communicated with the inner cavity.

\* \* \* \* \*